United States Patent [19]

Ross et al.

[11] 3,857,933

[45] Dec. 31, 1974

[54] PROCESS FOR THE MANUFACTURE OF A DRUG DOSAGE FORM PERMITTING CONTROLLED RELEASE OF ACTIVE INGREDIENT

[75] Inventors: Gerhard Ross, Liederbach/Taunus; Bernhard Reul, Schneidhain/Taunus, both of Germany

[73] Assignee: Farbwerke Hoechst Aktiengesellschaft vormals Meister Lucius & Bruning, Frankfurt/Main, Germany

[22] Filed: Feb. 8, 1974

[21] Appl. No.: 440,730

Related U.S. Application Data

[63] Continuation-in-part of Ser. No. 80,981, Oct. 15, 1970, abandoned.

[30] Foreign Application Priority Data

Oct. 17, 1969 Germany.......................... 1952304

[52] U.S. Cl............................ 424/20, 424/19, 424/22
[51] Int. Cl............................................. A61k 27/12
[58] Field of Search .............................. 424/19–22

[56] References Cited
UNITED STATES PATENTS

| | | | |
|---|---|---|---|
| 2,875,130 | 2/1959 | Grass et al. ........................... | 424/19 |
| 3,146,167 | 8/1964 | Lantz et al. ........................... | 424/22 |
| 3,361,632 | 1/1968 | Ross et al. ............................ | 424/22 |
| 3,374,146 | 3/1968 | Blicharz et al. ....................... | 424/19 |
| 3,670,065 | 6/1972 | Eriksson et al. ....................... | 264/131 |

Primary Examiner—Shep K. Rose
Attorney, Agent, or Firm—Curtis, Morris & Safford

[57] ABSTRACT

A drug dosage form adaptable to further processing without secondary shaping and permitting controlled release of a therapeutically active ingredient therefrom, said dosage form comprises a capsule filled solely with beads of an average diameter from about 0.1 to about 2.5 millimeters, each bead being similar in composition and consisting essentially of a. from 48.4 up to 81.4 percent of a castable carrier, sparingly soluble in the digestive tract, which is a glycol ester of a wax acid containing 22 to 39 carbon atoms;

b. from 13.6 up to 30 percent, by total weight of the beads, of said active ingredient present in said carrier in dissolved, dispersed or emulsified form; and c. from 5 percent to 21.5 percent of a physiologically tolerated surface-active substance present as an oil-in-water emulsifier and having a HLB value of 8 and higher; all said bead components of said capsule have a melting point of at least 45°C. and process for preparing it.

4 Claims, No Drawings

PROCESS FOR THE MANUFACTURE OF A DRUG DOSAGE FORM PERMITTING CONTROLLED RELEASE OF ACTIVE INGREDIENT

This is a continuation-in-part application of our co-pending application Ser. No. 80,981 filed Oct. 15, 1970 now abandoned.

The present invention provides a drug dosage form which permits controlled release of the active ingredient from a castable carrier which is sparingly soluble in the digestive tract and contains the pharmaceutically active substance in dissolved, suspended or emulsified form. The invention furthermore provides a process for the manufacture of such drug dosage forms.

Drug dosage forms consisting of a core containing the active ingredient and of a dragee coating, are already known. The coating consists mostly of therapeutically inactive substances such as sugar, ggum arabic, talcum or starch and gum often for covering the taste of bitter drugs. Drug coatings which are resistant to gastric fluid and which release the active ingredient of a tablet core only in the intestinal tract are also known. Furthermore, drug dosage forms have been prepared in which the active ingredient is enveloped with resorption-delaying coatings consisting of resin, fats or fatty acids.

As is known, such dragees or dragee-like drug dosage forms permit also extension of the release of the active ingredient over a prolonged period of time, if drug cores that are enveloped with coatings of different solubility or different thickness are simultaneously administered. Release of the active substance takes then place intermittently with more or less marked maximums which should be correspondingly distant from one another with regard to time and location. These distances are necessary, because if too large amounts of active ingredient are released, for example if the maximums are considerably exceeded or even completely superimposed, a hazardous overdosage may be the consequence. Since it is difficult to produce absolutely uniform coatings even with the means which are at present available, there is always the risk of a deviation from the intended course of the release entailing the above-mentioned consequences of a hazardous overdosage.

A similarly intermittent and hardly controllable release of the active substance takes place, as is also known, by tablets prepared from small kernels which contain the active ingredient and have been coated with different absorption-delaying coatings and then compressed with therapeutically inactive fillers into tablets. In addition to the abovedescribed disadvantages of such preparations, the process of manufacture is very expensive. It comprises, for example the preparation of the rounded kernels from sugar and starch in a coating pan, sieving of the kernels, pulverizing of the second coating mass and renewed pelletizing, separation of the particle mass in several portions, addition of the active ingredient, coating of the portions with protective coatings using different types of protective coating masses and different thicknesses of protective coatings, preparation of granules from fillers and compression of the granulated product with several particle-size fractions on a tabletting machine.

It is also known to envelope drug substances, which contain an active ingredient, with a coating acting as a dialysis membrane and releasing the active ingredient by diffusion. This process, however, is restricted to water-soluble drugs and involves the disadvantages generally implied in coatings.

There are also known retard preparations which consist of a mixture of bead fractions, the individual fractions being distinguished from one another by the fact that the carriers used in each fraction have different speed of dissolution or dispersion in water. Owing to the different solubility of the individual carrier substance fractions, such drug forms release the active substance intermittently in timely intervals, hence discontinueally. Therefore, such drug dosage forms have the same disadvantages as the dragees described above which have coatings of different thickness. In addition thereto, the preparation and combination of the different fractions with several carriers and their incorporation are very complex and require a high expenditure of time.

Now we have found a drug dosage form adaptable to further processing without secondary shaping and permitting controlled release of a therapeutically active ingredient therefrom, which dosage form comprises a capsule filled solely with beads of an average diameter from about 0.1 to about 2.5 millimeters, each bead being similar in composition and consisting essentially of 1. from 48.4 up to 81.4 percent of a castable carrier, sparingly soluble in the digestive tract, which is a glycol ester of a wax acid containing 22 – 39 carbon atoms;
2. from 13.6 up to 30 percent, by total weight of the beads, of said active ingredient present in said carrier in dissolved, dispersed or emulsified form; and
3. from 5 to 21.6 percent of a physiologically tolerated surface-active substance, present as an oil-in-water emulsifier and having a HLB-value of 8 and higher; all said bead components of said capsule have a melting point of at least 45° C. This drug dosage does not contain different carrier fractions and can be prepared by a single process, wherein a melt is made from a castable carrier substance which is sparingly soluble in the digestive tract and from at least one pharmaceutically active ingredient, the quantitative ratio of the components of this melt being so chosen that the mass melts from a temperature of about 45° C onwards. The melt is dropped preferably into a gas wherein the drops solidify, and the beads so obtained are further processed without secondary shaping into a dosage form.

The drug dosage form obtained according to the process of the invention, which consists of beads having different sizes within the mentioned range, is of similar form and composition. The release of the active ingredient from these shaped bodies takes place by continuous elusion during the desired period of time. After some hours, there remains behind the intact, extracted porous bead without active ingredient, which during the passage through the gastro-intestinal tract has not changed in form nor has been deformed, dispersed or dissolved as is the case with fat carriers. This secures to a maximum degree the reproducibility of the release of the active ingredient.

The composition of the melt containing the active ingredient must be so chosen that the mass starts melting from about 45° C onwards. A slight deviation to lower temperatures is possible, but the melting point must be some degrees above the body temperature when taking into account this criterion, the composition of the melt can be largely varied. It is also possible to give the melt the composition of a eutetic micture of the components forming it.

Processing of the melt into drops can be carried out with the aid of the apparatus known for the preparation of bead pills. Especially suitable for this purpose is the apparatus described in U.S. Pat. application Ser. No. 28,658 dated Apr. 9, 1970.

It is particularly advantageous to allow the beads to solidify in a gas. This gas may have room temperature or may be cooled. The gas may also be brought in countercurrent to the still liquid drops. The use of a gas avoids the sometimes difficult choice of the receiving medium which must be done when bead pills are taken up in a liquid, since it is then frequently necessary to take into account the presence of hydrophilic and hydrophobic components in the beads. If a liquid receiving medium is used, the solidified pills must in addition be made free from cooling liquid thoroughly.

The size of the bead pills is limited to a certain degree by the fact that in view of their later thrapeutical use they are generally stored in for example capsules. The borings of the drop-off apparatus should have such a size that the bead pills obtained have a diameter ranging from 0.1 to 2.5 mm. Thus, for example, with a boring of 0.95 mm diameter, the bead pills produced will have a diameter in the range of from 0.25 to 1 mm. The viscosity of the melt, a factor which has an influence on the size of the bead pills, has only secondary importance. Furthermore, the drop size can be influenced, for example by variation of the pressure existing in the drop-off apparatus above the melt.

Since a reduction of the diameter of the drops leads to a more rapid release of the active ingredient, it may be of interest to sieve out a narrower fraction from the drops so obtained.

The timely course of the release of the active ingredient can be influenced by variation of the components contained in the beads. Thus, it is possible to obtain a more rapid release of the active ingredient by adding to the carrier water-soluble inorganic or organic substances such as salts, sugar, sugar alcohols, protein hydrolysis products and/or polymers such as polyvinyl pyrrolidone or known pharmaceutical solubilizers such as sarcosine anhydride, dimethyl-acetamide, glycerin, glycols, etc. The quantity to be added can be suitably assessed experimentally by determination of the release of the active ingredient in the simulated comparative gastric and intestinal fluids known from literature. As castable carriers the glycol esters of wax acids are used per so or in mixtures with non-ionic polyglycol esters of fatty acids or polyglycol ethers of fat alcohols.

Furthermore, the carrier substance contains surface-active substances acting as oil-in-water emulsifiers. As such, there are used all physiologically tolerated emulsifiers or tensides having a HLB value of 8 and higher and which are physically and chemically compatible with the carrier substance. As examples, there may be mentioned polyglycol fatty acid esters with sorbitane as polyoxyethylene-sorbitan-monostearate, polyoxyethylene-sorbitan-monooleate and polyoxyethylene-(50)-stearate. Further suitable oil-in-water emulsifiers are mentioned in "Parfumerie und Kosmetik," vol. 41, page 90 (1960) and in "Catalog of Atlasproducts for the Cosmetic and Pharmaceutical Industry," pages 12 and 13 (1964).

It is known from literature that release of the active ingredient from shaped bodies made of fats, for example from suppositories, takes place only when the carrier substance is completely molten. It was, therefore, surprising that with the shaped bodies of the invention, for example those made of wax mixtures which do neither soften nor melt at body temperature, make possible such a complete release of the active ingredient.

The use of waxes also brings considerable advantages with regard to the stability of the carrier substances, because these cannot become hydrolyzed or rancid as this is often the case with fat carriers. The stability of the active ingredient is also improved by the incorporation into wax carriers. Thus, if waxes are used as carrier substances, a negative influence on the drug by perioxides of rancid fats and/or free fatty acids from hydrolyzed fats is completely avoided.

Further possibilities of varying the release of the active ingredient, in addition to the variation of the composition of the beads, are also offered by modification of the solidification point which can be effected, for example by adding increasing amounts of surface-active substances to waxes or by certain measures in the processing of the active ingredient, for example, variation of the grain size of the active substance.

The melts are prepared in known manner by thoroughly mixing the components of the melt and then carefully heating them. It is of advantage when the components, especially the active ingredients, are converted into a molten mass in an as finely as possible distributed ground form. It is also possible first to melt the carrier substances and then to carefully introduce the active ingredient.

The quantity of the admixed active substance depends in the first instance on its therapeutic activity. However, the active substance is not used in a quantity higher than 30 percent of the total molten mass.

Compared with the known processes, the process according to the invention represents an essential simplification in the manufacture of drug dosage forms with resorption-delaying action. The drug dosage form is prepared from a single melt only, so that compressing and coating processes which may imply rists such as for example over-dosage due to irregular intermittent release of the active ingredient, are avoided. Unintentional mechanical action on the shaped bodies does not influence the release of the active substance, in contradistinction to drug dosage forms which are provided with a coating. The manufacturing process can be carried out continuously, so that any other stepwise operations can be avoided.

The beads obtained according to the present invention show no dependence of the release of the active ingredient on the pH-value and on the enzyme content of the digestive fluids. Owing to the instable and not melting carrier structure, the delaying action is well reproducible from batch to batch. By combination of bead pill fractions which contain active ingredients that are incompatible with each other or react with each other, it is possible to incorporate in a single long-acting preparation, several active substances at the same time. By reason of their hardness and their melting point of more than about 45°C the beads od of invention can be easily manipulated and filled on an industrial scale, in contradistinction to the known fat beads, which in most cases must be additionally coated.

In comparison to fat pills, the beads of the invention are well stable. The active ingredients incorporated into the beads are well protected against external influences such as light, air, etc. They fully satisfy the requirements which in general have to be met by coated drug dosage forms such as improvement of the tolerability of active ingredients that cause irritation of the gastro-intestinal tract, prevention of taste in the case of active substances having a disagreeable taste and the possibility of a release of the active substance in the small intestine.

The effect of a delayed release of the active substance obtained with the bead pills of the invention cannot be explained directly from the individual process steps. Although smaller pills release the active substance contained in them faster than larger ones, as is known, the difference in the size of the pills according to the invention is much too small to play a decisive role for such a release of active substance. Even the solidification form which is especially favorable for the delayed and, after normal dwelling times, practically complete elution of the active substance from the carriers is, seen alone, not of decisive importance. The adjustment of the components of the melt to give a mass which is solid at normal body temperature and which is only superficially elutable, even after some hours, in simulated digestive fluids, is as such opposed against the effect aimed at, at least against a complete elution of the active substance. Consequently, it is presumed that the effect obtained is due essentially to an unexpected interaction of the process steps.

The following Examples illustrate the invention:

EXAMPLE 1

The active substance phenylethyl-biguanide-HCl had to be brought into a drug dosage form permitting release of the active substance in the gastro-intestinal tract during a period of about 10 hours.

For this purpose, the active substance was first comminuted on a hammer mill to a grain size in the range of from 20 to 80 $\mu$m. Then, a mixture containing 17.0 percent of this active ingredient, 76.8 percent of glycol wax ester (glycol ester of a wax acid containing 22 to 39 carbon atoms) and 6.2 percent of polyglycol fatty acid ester (polyoxyethylene-(50)-stearate), was molten. For determining the solidification point and behaviour in solution, a sample was withdrawn. If necessary, the molten mass could be adjusted by the addition of a carrier component.

The melt was then pressed through a spray head having borings of a diameter of 0.95 mm to form drops which fell into a 8 m deep tunnel against a pre-cooled weak stream of air. Dust-fine particles were dragged upwards and separated. At the bottom of the tunnel, beads accumulated which had diameters in the range of from 0.75 and 1 mm; they were conveyed to a filling station and dosed into capsules. The portion of fines was again molten.

Three capsules withdrawn at random from different batches showed in simulated comparative solutions the behaviour indicated in Table 1.

Table 1

| Time after hours | Comparative solution | Release of active ingredient (%) | | |
|---|---|---|---|---|
| | | Capsule 1 | Capsule 2 | Capsule 3 |
| 1 | Gastric fluid | 34 | 33 | 31 |
| 2 | Gastric fluid | 48 | 47 | 46 |

Table 1-Continued

| Time after hours | Comparative solution | Release of active ingredient (%) | | |
|---|---|---|---|---|
| | | Capsule 1 | Capsule 2 | Capsule 3 |
| 3 | Buffer | 59.5 | 58.5 | 57 |
| 4 | Intestinal fluid | 68 | 66 | 66 |
| 5 | Intestinal fluid | 75 | 74 | 74.5 |
| 6 | Intestinal fluid | 80 | 79 | 79 |
| 7 | Intestinal fluid | 84 | 84.5 | 84 |
| 8 | Intestinal fluid | 88 | 89 | 88.5 |
| 9 | Intestinal fluid | 91 | 92.5 | 91.5 |
| 10 | Intestinal fluid | 95 | 96 | 95.5 |

The above table shows that the measured release values are narrow with respect to one another.

EXAMPLE 2

In order to shorten the release time of phenylethyl-biguanide to 4 to 5 hours, with preferred release of this active substance in the gastric fluid, the proportion of the hydrophilic component of the carrier was increased; thus a melt was prepared consisting of 17 percent of the active substance having a grain size of 20 to 80 $\mu$m, 73.5 percent of glycol was ester and 9.5 percent of polyglycol fatty acid ester and processed as described in Example 1.

The release of the active substance proceeded in accordance with the data given in Table 2.

Table 2

| Time after hours | Comparative solution | Release of active ingredient (%) |
|---|---|---|
| 1 | Gastric fluid | 63.5 |
| 2 | Gastric fluid | 84 |
| 3 | Buffer | 92.5 |
| 4 | Intestinal fluid | 98 |
| 5 | Intestinal fluid | 99.8 |

EXAMPLE 3

A prolongation of the time of release of the active substance mentioned in Examples 1 and 2 to more than 10 hours was obtained by increasing the hydrophobic proportion of the carrier; the melt contained 17 percent of active substance, 78 percent of glycol wax ester and 5 percent of polyglycol fatty acid ester.

The release of the active substance proceeded in accordance with the data given in Table 3.

Table 3

| Time after hours | Comparative solution | Release of active ingredient (%) |
|---|---|---|
| 1 | Gastric fluid | 20 |
| 2 | Gastric fluid | 31 |
| 3 | Buffer | 38 |
| 4 | Intestinal fluid | 44 |
| 5 | Intestinal fluid | 50 |
| 6 | Intestinal fluid | 57 |
| 7 | Intestinal fluid | 63 |
| 8 | Intestinal fluid | 70 |
| 9 | Intestinal fluid | 76 |
| 10 | Intestinal fluid | 81 |

EXAMPLE 4

A melt consisting of
| | |
|---|---|
| phenylethyl-biguanide-HCl | 17.0 g |
| glycol ester of a wax acid having 22 to 39 carbon atoms | 74.7 g |
| polyoxyethylene-(50)-stearate | 8.3 g |
| | 100.0 g | was dropped into a solidification medium having the following composition:

| | |
|---|---|
| n-hexane | 60 parts by volume. |
| Frigen 113 | 20 parts by volume. |
| Paraffin. liquid. | 20 parts by volume. |

The beads were then freed from adhering solidification medium.

EXAMPLE 5

A melt was prepared according to the process described in Example 1 from

| | |
|---|---|
| 4-chloro-N-(2-furylmethyl)-5-sulfamoyl-anthranilic acid | 13.6 g |
| glycol ester of a wax acid having 22-39 carbon atoms | 64.8 g |
| polyoxyethylene-sorbitane monooleate | 21.6 g |
| | 100.0 g | and processed into drops in the manner indicated in said Example.

Beads having a diameter in the range of from 0.75 to 1.0 mm showed, when eluted in artificial digestive fluid, the delayed release of the active substance shown in the diagram FIG. 1.

EXAMPLE 6

In accordance with the process described in Example 1, a melt was prepared from

| | |
|---|---|
| 1-phenyl-1-(2-pyridyl)-3-dimethyl-aminopropane as hydrogeno-maleinate | 25.5 g |
| glycol ester of a wax acid having 22 to 39 carbon atoms | 68.9 g |
| polyoxyethylene-(50)-stearate | 5.6 g |
| | 100.0 g | and processed into beads in the manner indicated in said Example.

Beads whose diameter was in the range of from 0.75 to 1.0 mm showed, when eluted in artificial digestive joice, the delayed release of the active substance illustrated in FIG. 2 in the form of a curve.

EXAMPLE 7

The influence of differently hydrophilic additions on the release of the active substance phenylethyl-biguanide is shown by the following example:

In accordance with the process described in Example 1, a melt was prepared from

| | |
|---|---|
| phenylethyl-biguanide-hydrochloride | 17.0 g |
| glycol ester of a wax acid having 22-39 carbon atoms | 74.7 g |
| hydrophilic additive | 8.3 g |
| | 100.0 g | and processed into beads in the manner indicated in said Example.

Corresponding to their different hydrophily, the following "hydrophilic additives" were used (each time equal amounts):

1. polyvinyl-pyrrolidone
2. polyoxyethylene-(50)-stearate (PEG-stearate)
3. polyoxyethylene-sorbitane-monooleate (Tween 80)
4. polyoxyethylene-sorbitane-monostearate (Tween 60)
5. lecithine Bead pills of these 5 batches having a diameter of 0.75–1.0 mm showed, when eluted in simulated digestive fluids, the differently delayed release of active substance illustrated by the curve diagrams of FIG. 3, which depended on the hydrophilic additive used in each case.

We claim:

1. A drug dosage form permitting controlled release of a therapeutically active ingredient therefrom, said dosage form comprises a capsule filled solely with beads of an average diameter from about 0.1 to about 2.5 millimeters, each bead being similar in composition and consisting essentially of
   a. from 48.4 percent up to 81.4 percent of a castable carrier, sparingly soluble in the digestive tract, which is a glycol ester of a wax acid containing 22 to 39 carbon atoms;
   b. from 13.6 percent up to 30 percent, by total weight of the beads, of said active ingredient present in said carrier in dissolved, dispersed or emulsified form; and
   c. from 5 percent to 21.5 percent of a physiologically tolerated surface-active substance present as an oil-in-water emulsifier and having a HLB value of 8 and higher; all said bead components of said capsule having a melting point of at least 45° C.

2. A drug dosage form as claimed in claim 1, wherein the surface-active substance is polyoxyethylene-(50)-stearate. polyoxyethylene-(50)-stearate.

3. A drug dosage form as claimed in claim 1, wherein the surface-active substance is polyoxyethylene-sorbitan-monooleate.

4. A drug dosage form as claimed in claim 1, wherein the surface-active substance is polyoxyethylene-sorbitan-monostearate.

* * * * *